United States Patent [19]

Pierce

[11] Patent Number: 4,634,314
[45] Date of Patent: Jan. 6, 1987

[54] COMPOSITE MARINE RISER SYSTEM

[75] Inventor: Robert H. Pierce, Houston, Tex.

[73] Assignee: Vetco Offshore Inc., Ventura, Calif.

[21] Appl. No.: 624,621

[22] Filed: Jun. 26, 1984

[51] Int. Cl.[4] ............................................ E21B 17/01
[52] U.S. Cl. .................................. 405/195; 166/350; 166/367; 405/203
[58] Field of Search ....................... 405/195, 203–208; 166/350, 357, 367; 175/5, 7; 156/173, 169; 138/109, 130

[56] References Cited

U.S. PATENT DOCUMENTS

| | | | |
|---|---|---|---|
| 3,537,484 | 11/1970 | McLarty | 285/149 X |
| 3,538,238 | 11/1970 | DeLarcour et al. | 166/359 X |
| 3,651,661 | 3/1972 | Darrow | 138/130 X |
| 3,768,842 | 10/1973 | Ahlstone | 166/350 X |
| 3,974,012 | 8/1976 | Hogarth | 156/173 X |
| 4,116,009 | 9/1978 | Daubin | 405/195 X |
| 4,192,351 | 3/1980 | Henry | 138/130 X |
| 4,238,539 | 12/1980 | Yates et al. | 156/173 X |
| 4,248,062 | 2/1981 | McLain et al. | 138/130 X |
| 4,290,836 | 9/1981 | McPherson et al. | 156/173 X |
| 4,332,509 | 1/1982 | Reynard et al. | 405/195 X |

OTHER PUBLICATIONS

Hercules Composite Structures brochure, Hercules Incorporated.

Primary Examiner—Dennis L. Taylor
Attorney, Agent, or Firm—Hubbard, Thurman, Turner & Tucker

[57] ABSTRACT

Tubular marine riser sections are formed by a wound or woven filament-resin matrix tubular body having a modulus of elasticity in tension of about 27,000,000 psi or greater utilizing carbon or boron for the filament material. The riser sections may be provided with end couplings secured to the tubular body for forming a riser system wherein the tensile strength or load bearing capacity of each section and its hydrostatic collapse resistance may be selectively determined by its position in the riser system. The riser sections may be provided with cylindrical collapse resisting ribs defining spaced buoyancy chambers filled with low density material contained by an outer shell formed of a glass or aramid fiber-resin matrix composite having a lower modulus of elasticity in tension than the primary load bearing tubular member. An inner abrasion and fluid impervious sleeve is disposed within the tubular body but is not bonded thereto. Multiple conduit riser sections may be utilized as anchoring members for a floating platform and the like.

36 Claims, 6 Drawing Figures

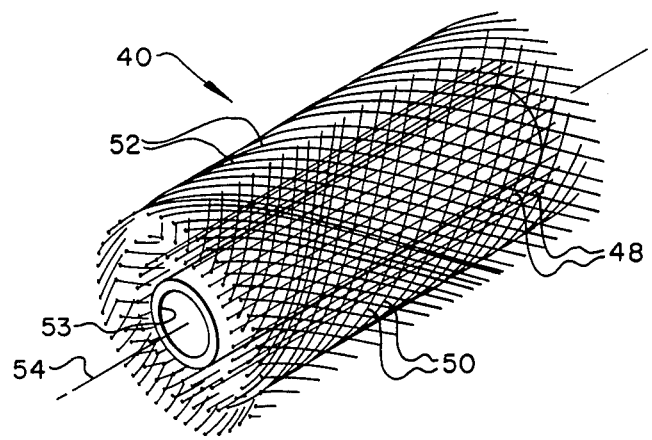
FIG. 3
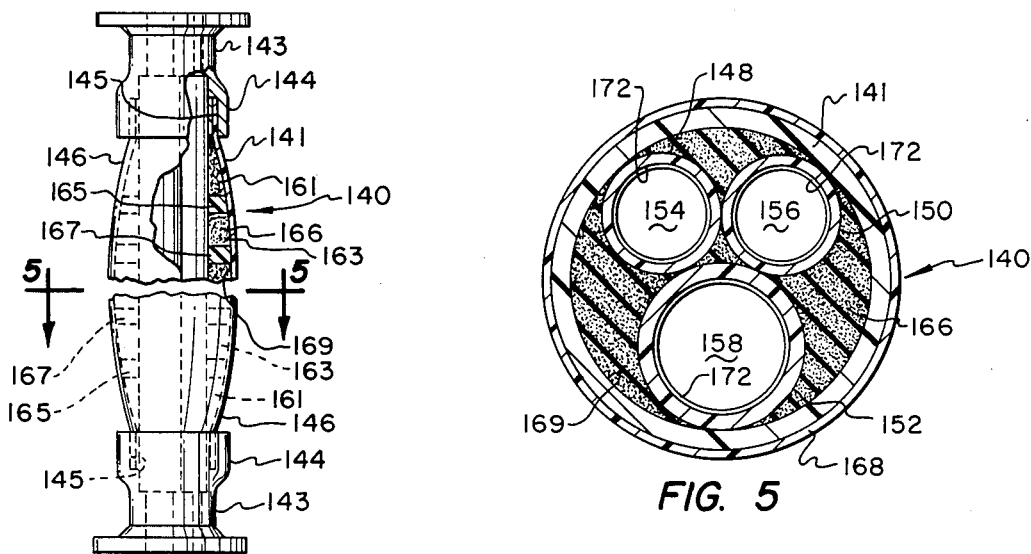
FIG. 4
FIG. 5
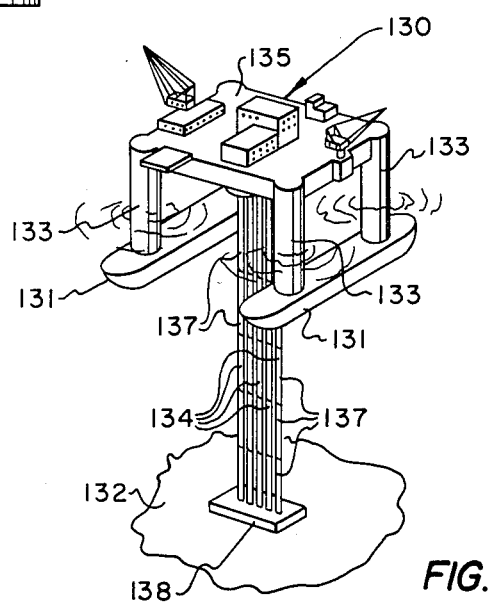
FIG. 6

COMPOSITE MARINE RISER SYSTEM

BACKGROUND OF THE INVENTION

1. Field of the Invention

The present invention pertains to a marine riser system made up of a plurality of end to end connected tubular riser sections which are formed of tubular load bearing composite bodies formed of a filament wound fiber/resin matrix having an inner protective liner and an outer protective and buoyant shell structure. The configuration of the riser sections from the seabed to a surface connection varies to accommodate specific conditions at each elevation.

2. Background

The continued development of offshore hydrocarbon deposits has presented problems in the design of structures to provide access to and production of fluids from these deposits. One of the more vexatious structural engineering problems pertains to the provision of the marine riser system used in drilling and in the production of well fluids from submarine deposits. The development of hydrocarbon deposits in water depths exceeding 1500 feet is now contemplated and in process. The provision of a tubular conduit up to 24 inches in diameter or greater extending and supported over several thousand feet from the water surface to the seabed presents a unique engineering problem.

The provision of tubular steel riser sections in manageable lengths which will permit makeup and break out of a riser string and which will be adequate strength to prevent rupture, bending or collapse requires tubular wall thicknesses and supporting structure which become selflimiting. In order to reduce the strength and size requirements of tensioning and heave compensation apparatus for supporting the upper end of a riser string and to limit the buoyancy requirements of the vessel, it has been contemplated to provide various types of buoyancy structures which are disposed around steel and other metallic riser sections to offset the requirements for supporting the riser column under suitable tension to prevent collapse. These buoyancy structures, sometimes in the form of large sleeves of buoyant material or air filled caisson type structures, are particularly cumbersome to deal with in making up or breaking down a riser system. Moreover, the monitoring of air filled caisson structures and the prospect of failure of these structures also makes them unattractive as means for supporting a submarine riser string.

In an effort to overcome the disadvantages of using steel, aluminum or other metals for submarine risers and similar tubular components it has been contemplated to provide nonmetallic composite structures such as the glass fiber-epoxy matrix composite pipe of the type described in U.S. Pat. No. 3,768,842 to A. G. Ahlstone. However, the provision of a glass fiber-resin matrix composite structure as the primary load bearing body suffers from a significant disadvantage. The modulus of elasticity of such structures is significantly less than steel, thereby requiring heave compensation or tensioning equipment on the floating platform or vessel to which the riser is attached which must undergo substantial linear excursion in order to maintain suitable tension in the riser string. Moreover, the elongation of a structure made up of a glass fiber reinforced plastic composite is particularly dangerous as regards the violent movement of the riser which would occur in the event of intentional disconnection of the riser or parting of the riser somewhere between the wellhead or other subsea anchor point and the heave compensating or tensioning equipment. This type of violent action cannot be risked around the expensive equipment and structure associated with floating drilling or production platforms and similar vessels.

Certain other considerations in the design of a marine riser also include the requirement that the riser be impermeable to fluids carried within the riser bore and the provision of suitable buoyancy and exterior wear and impact resistant structure which is exposed to the marine environment. Accordingly, the glass fiber reinforced resin composite structure suffers from certain disadvantages which make it unattractive for use as the main load bearing structure in a marine riser system. The desiderata of a structural load bearing member having a sufficient stiffness or high modulus of elasticity together with low density and properties of tensile strength which are comparable to or better than alloy steel or other high strength metals and suited for use as a marine riser type structure has eluded art workers prior to the development of the present invention.

SUMMARY OF THE INVENTION

The present invention provides a tubular marine riser member having one or more generally cylindrical tubular load bearing bodies formed from a carbon or boron fiber-resin matrix having tensile strength greater than and a modulus of elasticity approximately equal to or greater than alloy steel and having a density no more than 25% to 30% that of a comparable steel structure. The provision of such a riser member also provides a riser system made up of a series of end to end coupled riser members having axial elongation under typical loads to which such members are exposed no greater than an equivalent steel system. The provision of a carbon or boron fiber-resin composite structure as the main load bearing member and having mechanical properties equivalent to or superior to those of steel tubular members of similar configurations allows the use of risers of composite construction to be substituted for existing riser systems and similar tubular members used in a marine environment in the development of hydrocarbon deposits. The provision of a marine riser in accordance with the present invention thus allows the use of existing riser tensioning and heave or motion compensating equipment in water depths wherein steel risers are now being used as well as in greater operating depths at which steel and other materials become highly unattractive.

In accordance with one aspect of the present invention there is provided a composite marine riser member comprising an elongated tubular load bearing body formed from wound filament or so-called laid up filaments of carbon, boron or similar elements having the modulus of elasticity characteristics of carbon filaments in a resin matrix and constructed for carrying substantial axial, bending, torsional and internal pressure induced loads. The primary axial tension, bending and internal pressure induced load bearing body is disposed within an integral outer shell which is constructed to provide near neutral buoyancy of the riser section in sea water. The outer shell construction preferably has a modulus of elasticity less than the main load bearing body to provide relatively easy compliance with the strain incurred by the main load bearing body. The outer shell preferably is characterized by a water impervious and non-galvanic reacting structure comprising a glass or aramid fiber composite structure configured to maximize collapse resistance, minimize hydrodynamic drag and have sufficient impact resistance to withstand handling in the normal environment of marine riser members. A non-galvanic reacting, water impervious layer is preferably applied to the outer surface of the shell and to exposed surfaces of the carbon or boron filament composite body to substantially eliminate galvanic action.

In accordance with yet another aspect of the present invention there is provided a marine riser section having an elongated filament or fiber resin composite structure formed as a tubular member together with a composite outer shell which may be provided with non-pressurized buoyancy chambers or filler material to provide a preselected buoyancy for the section and to provide a very low rate of elongation under the normal tensioning loads experienced in very long riser strings. The riser sections are preferably formed to have an inner tubular liner member which is not intentionally physically bonded or secured to the main load bearing composite body but which is of a material having a modulus of elasticity equal to or less than the modulus of elasticity of the composite tubular structure to provide suitable compliance during elongation or expansion of the main load bearing body and to form a wear resistant and fluid impervious liner for the main load bearing body.

Marine riser sections in accordance with the invention may be constructed to utilize conventional end fittings which are secured to the main structural composite body by suitable means such as load bearing pins, and the riser sections may be easily adapted to carry suitable signal carrying conductors through the composite body and to be provided with signal generating members spaced apart along the body to generate suitable signals for measuring equipment being extended through the riser system.

In accordance with yet another aspect of the present invention there is provided a marine riser system made up of a plurality of end to end connected riser sections wherein each riser section is formed from a generally tubular, carbon or boron filament-resin composite body and wherein the respective riser sections are selectively constructed to accommodate axial and bending loading, buoyancy considerations and to provide maximum resistance to collapse or deflection in accordance with their respective positions in the riser system.

The present invention still further contemplates the provision of a composite tubular body which provides a stressstrain characteristic similar to or significantly greater than steel, is considerably less dense than steel and may be easily configured to provide a desired buoyancy characteristic in sea water and to serve as fluid conducting conduits as well as anchoring means inclusive of catenary mooring lines and tension support legs for various types of floating structures.

The above described features and advantages of the present invention as well as additional superior aspects thereof will be further appreciated by those skilled in the art upon reading the following detailed description in conjunction with the drawing.

BRIEF DESCRIPTION OF THE DRAWING

FIG. 3 is a somewhat schematic perspective view of a portion of the load bearing tubular body of a riser section in accordance with the present invention showing a typical arrangement of the filaments;

FIG. 4 is an elevation view of a multiple tube riser section in accordance with the present invention;

FIG. 5 is a section view taken along the line 5-5 of FIG. 4; and

FIG. 6 is a schematic elevation of a tension leg platform utilizing composite riser or leg sections in accordance with the present invention.

DESCRIPTION OF THE PREFERRED EMBODIMENTS

Figure 1:
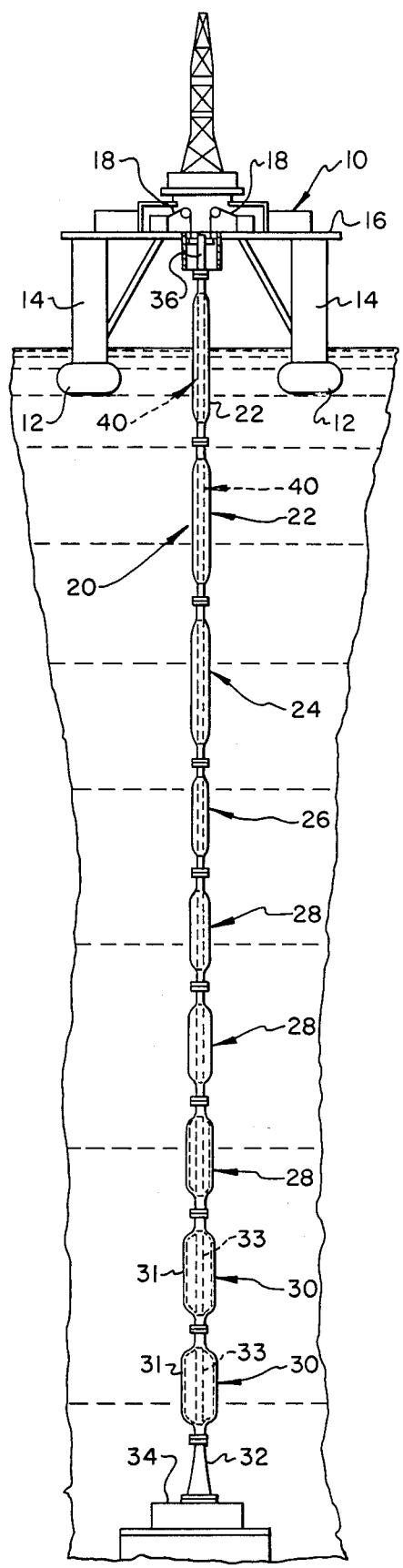
FIG. 1 is a schematic elevation view of a marine riser system in accordance with the present invention connected between a wellhead and a structure at the surface.

In the description which follows like parts are marked throughout the specification and drawing with the same reference numerals, respectively. The drawing figures are not necessarily to scale and certain features of the invention are shown exaggerated in scale and in somewhat schematic form in the interest of clarity.

The present invention contemplates the provision of generally tubular load bearing fluid conducting members which may take various forms in accordance with their specific applications but are typically characterized by applications in a marine environment wherein the member is generally in tension and is disposed in a submerged condition such as forming part of a so-called riser or anchor member used in connection with offshore development and production of hydrocarbons. Referring to FIG. 1, there is illustrated a particularly unique and important application for the present invention comprising drilling or production riser system for use with an offshore floating drilling or production platform such as the platform 10 illustrated in somewhat schematic form. The exemplary platform 10 illustrated is a column stabilized semi-submersible vessel having spaced apart submersible hull sections 12 supporting stabilizing columns 14 which in turn support a deck 16. The vessel 10 is equipped with conventional heave compensating or tensioning apparatus, generally designated by the numeral 18 which is connected to the upper end of an elongated riser string 20 comprising a series of end to end connected riser sections 22, 24, 26, 28, 30 and 32 suitably connected to a seabed manifold or wellhead 34. It should be noted that the schematic illustration of FIG. 1 is not intended to represent the entire length of a riser system which may involve the use of a great number of riser sections of different lengths and having different specific constructions according to the invention and as will be described further herein. The upper end of the riser system 20 may include a short riser section 36 which is connected directly to the tensioning and heave compensating apparatus 18 so that as the vessel 10 rises and falls with wave action a substantially constant tension is maintained on the riser system to prevent buckling or collapse.

As described above, in accordance with the present invention it is contemplated that the riser system 20 shall have two outstanding characteristics, (1) the buoyancy of the riser system is approximately neutral or slightly negative and the elongation of the system under tensile load is not substantially greater than a riser system made out of steel and preferably is less than steel thereby simplifying the construction of the tensioning and heave compensating apparatus 18. In fact, it is contemplated that a riser system in accordance with the present invention may replace a steel riser system without requiring modification or replacement of the heave compensating and tensioning equipment on a typical installation. The riser system 20 also contemplates the provision of a number of end to end connected riser sections which are generally of the configuration of the riser section 22 to be described herein in conjunction with FIGS. 2 and 3 of the drawings but are modified as to their overall length and as to the specific configuration of an outer collapse resistant shell and an inner elongated load bearing body in accordance with the position of the riser section in the system.

Figure 2:
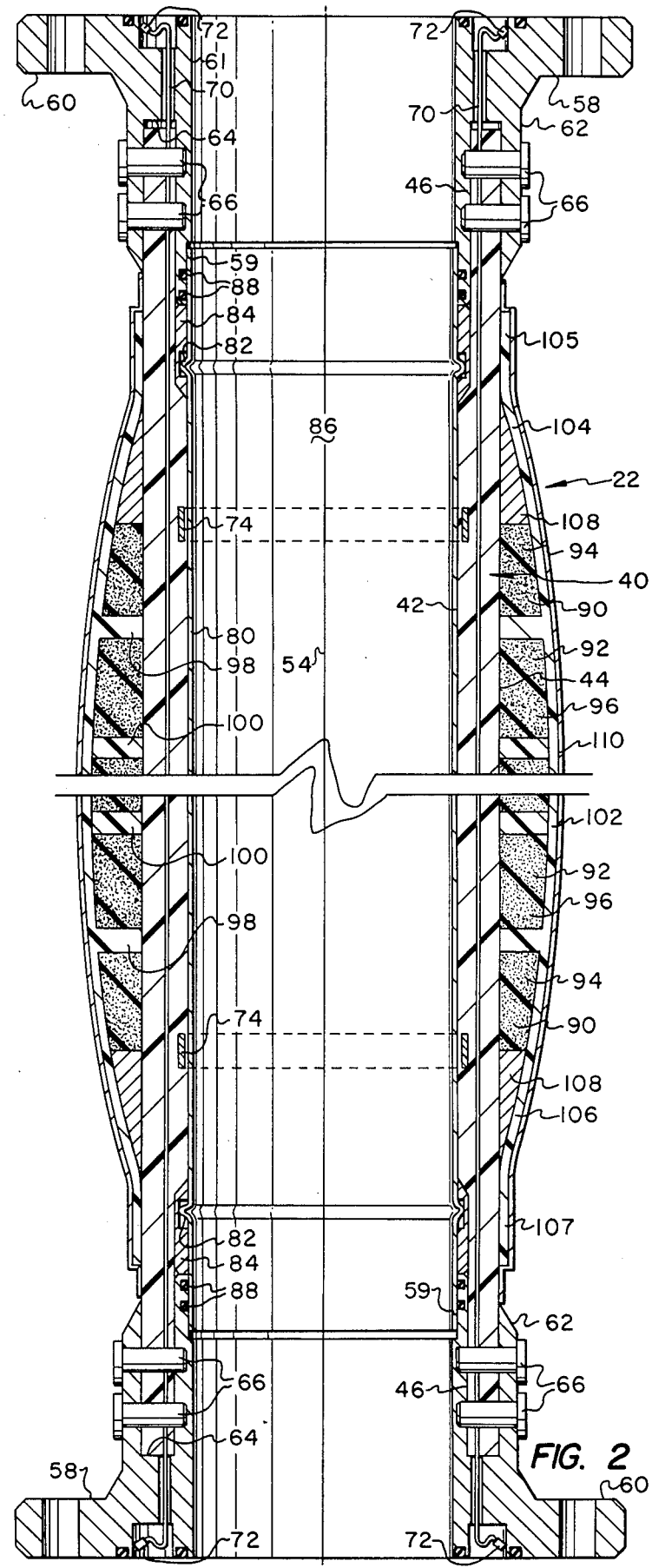
FIG. 2 is a fragmentary longitudinal central section view of a marine riser section in accordance with the present invention.

A better understanding of the features of the riser system and, in particular, the structural features of each riser section will be gained from the description of a typical riser section such as one of the sections 22 in conjunction with FIGS. 2 and 3. Referring to FIG. 2, in particular, the riser section 22 comprises an elongated tubular body 40 having an inner cylindrical bore wall 42 and an outer cylindrical wall surface 44. Opposite ends of the body 40 have a somewhat enlarged bore wall 46 slightly larger in diameter than the bore wall 42 to accommodate manufacturing tooling such as winding mandrels. The body 40 is constructed to be a primary tensile torsional, internal pressure and bending load bearing member and, in accordance with the present invention, is constructed primarily of carbon filaments and a bonding resin matrix such as an epoxy compound. The arrangement of the carbon filaments within the body 40 may take various forms in accordance with the load bearing requirements but, typically, as illustrated in FIG. 3, may be made up of alternate layers of generally axially extending carbon filaments 48 arranged in a cylindrical pattern and spiral or helically wound filaments 50 and 52 which are wound in opposite directions on a mandrel 53 and at a predetermined helix angle with respect to the longitudinal central axis 54 of the body 40 in accordance with the specific tensile load requirements of the body. The filaments 48, 50 and 52 are preferably embedded in and bonded by a matrix which may, typically, be an epoxy or other suitable resin. The filaments may range in diameter from 0.00031 inches to 0.001 inches and when embedded in a resin matrix provide a structure which typically has a modulus of elasticity (Young's modulus) of at least twenty-seven million ($27 \times 10^6$) psi, a tensile strength in the range of 140,000 to 185,000 psi and a density of approximately 0.059 pounds per cubic inch. The body 40 may, in fact, be constructed in accordance with forming the body over a suitable mandrel and the fibers 48, 50 and 52 may be prearranged in a woven mat or wound on the mandrel in accordance with techniques practiced by the aerospace industry.

Those skilled in the art will appreciate that the particular selected longitudinal tensile strength of the body 40 relative to the axis 54 and the hoop strength of the body 40 with respect to the axis 54 may be preselected in accordance with the number of layers of filaments 48, 50 and 52 as well as the winding angles of the filaments with respect to the axis 54. This is a particularly important aspect in accordance with the present invention since the riser sections 22, 24, 26, 28 and 30 as well as the end sections 32 and 36 may be constructed of inner body sections and outer shell sections to be described herein in accordance with the requirements of the vertical position of the riser section in the riser system 20.

Referring further to FIG. 2, the riser section 22, by way of example, is provided with opposed flanged end coupling members 58 which each have a transverse flange portion 60 of a conventional cylindrical flange configuration and an axially extending hub portion 62 provided with an annular channel 64 for receiving an end of the body member 40. The body member 40 is preferably secured to the coupling members 58 at its opposite ends by closefitting pins 66 which extend through cooperating bores in the coupling members 58 and in the ends of the body member 40. Other configurations of end couplings and attachment means may be utilized in accordance with the teachings of the present invention.

Suffice it to say that the coupling members 58, which would likely be formed of metal such as titanium or other high strength materials, are adapted to support the body member 40 for tensile, bending and torsional loading and to accommodate elements such as elongated electrical or optical signal conductors 70 which extend through the respective coupling members 58 and longitudinally through the body member 40. The conductors 70 are adapted to be fitted with suitable connector elements 72 for connection to similar conductors provided in the adjoining riser section. For convenience the conductors 70 are illustrated in the plane of the drawing FIG. 2, although, in reality they would extend longitudinally through the body member 40 and the couplings 58 at a circumferentially spaced point relative to the pins 66 with respect to the axis 54 so as to not interfere with the pins 66. The conductors 70 are suitably embedded in the body member 40 such that axial elongation of the conductor members is avoided. For example, the conductor members 70 may be enclosed in a longitudinally extending sheath or tube, not shown, embedded in the matrix of the body member 40.

In accordance with another aspect of the present invention signal generating elements 74 such as rings of magnetic or radiation emitting material may also be embedded in the matrix of the body member 40 at predetermined spaced intervals from the flanges of the coupling members 58, respectively, to serve as signal generators for certain types of downhole measuring equipment such as an instrument sensitive to a magnetic field generated by the elements 74.

The riser section 22 is also advantageously provided with a fluid impervious, corrosion and abrasion resistant liner sleeve, generally designated by the numeral 80 which is disposed in snug fitting relationship to the bore wall 42 but it is not intentionally bonded to the body member 40. The sleeve 80 may be formed of a suitable material such as carbon or stainless steel or a non-metallic material such as urethane type plastic. The sleeve 80 is typically provided with radially outwardly extending circumferential projections 82 adjacent its opposite ends which are disposed in cooperating grooves formed in the body member 40 or in a body member insert 84. The projections 82 locate the sleeve 42 relative to the body member 40 to prevent axial displacement thereof and compensate for strain related elongation, thermal elongation or contraction of the sleeve 80. The sleeve 80, of course, forms an elongated central passageway 86 through which fluids, and downhole well equipment may be conducted for various types of exploration, drilling and production operations. Cooperating seal members such as annular O-rings 88 are disposed adjacent opposite ends of the sleeve 80 and are contiguous with the outer diameter thereof to seal the sleeve from the incursion of fluids between the outer diameter of the sleeve 80 and the bore wall 42. The sleeve 80 typically fits within a counterbore 59 formed in the coupling hub 60 and which is suitbly modified to receive the seal rings 88, for example. In the exemplary riser section 22 a continuous single diameter bore is formed by the sleeve 80 and bores 61 formed in the coupling hubs 62.

The riser sections for the riser system 20 should for the most part be adapted to provide minimum negative buoyancy to reduce the tensile load requirements of the heave compensator and tensioner apparatus 18 and to minimize the tensile loading on the respective riser sections, particularly those closer to the water surface. In accordance with the present invention the riser section 22 as well as certain ones of modified versions of the riser section 22 are provided with a plurality of buoyancy chambers 90 and 92, for example, which may be filled with a suitable buoyancy material comprising a low density fluid, rigid, open or closed cell foam material, syntactic foam or a metal or non-metal honeycomb structure.

In the riser section 22, for example, annular buoyancy members 94 and 96 formed of, for example, metal or plastic honeycomb are disposed around the body member 40 and are spaced apart by interpositioned cylindrical ringlike ribs 98 and 100. The ribs 98 and 100 are contiguous with the outer circumferential surface 44 of the body member 40 but are preferably not bonded or secured thereto. The ribs 98 and 100 are disposed in supportive relationship to an outer shell member, generally designated by the numeral 102 which is a generally elongated cylindrical structure having opposed radially inward or conical tapered end portions 104 and 106 which are contiguous with and secured to the body member 40 at opposite ends 105 and 107. The shell 102 is also contiguous with the outer peripheral surfaces of the ribs 98 and 100 and with generally conical tapered insert members 108 disposed to support the tapered portions 104 and 106 of the shell 102. The ribs 98 and/or 100 may be formed integral with the shell 102, as indicated for the ribs 98 in FIG. 2. The shell 102 is adapted to form a water impervious and collapse resisting structure around the buoyancy chambers 90 and 92 and buoyancy structure such as the foam rings 94 and 96 contained within the buoyancy chambers. The shell 102 is preferably constructed of a composite glass or aramid filaments which are provided in the form of mat or wound on a mandrel in the same manner generally as the body 40 and embedded in a resin matrix such as polyester or epoxy. In the embodiment illustrated in FIG. 2 the ribs 98 are also formed by winding or laying up the glass or aramid fibers in a resin matrix. Other materials may be used for the filaments making up the construction of the shell 102 but it is important that the modulus of elasticity of the shell 102 in tension be less than the modulus of elasticity of the body 40 so that the shell 102 is not unduly stressed by elongation of the body 40. The filament windings in the shell 102 are preferably increased in number and oriented in hoop configuration at the ends 105 and 107 to resist water incursion between the shell and the body 40.

The ribs 98 and 100 may be formed of one of several materials such as a composite of the same type as the body 40 or the shell 102. Alternatively, of course, the ribs 98 and 100 may be formed of metals such as steel or aluminum. The ribs 98 and 100 advantageously transmit radially inwardly and outwardly directed forces exerted on the shell 102 and the body 40, respectively, to resist collapse of the shell 102 and to resist bulging of the body 40. The inserts 108 provide additional collapse resisting structure for the shell 102 at the portions of the shell which taper toward engagement with the exterior surface 44 of the body 40.

The outer surface of the riser section 22 between the coupling members 58 is preferably provided with a water impermeable and non-galvanic active layer 110 which may be formed of a synthetic film covered by or embedded in the same material as the matrix for the shell member 102 such as a polyester or epoxy resin. In this way, any galvanic action is precluded from taking place between the carbon filaments of the body 40 and adjacent structures in the sea around the riser section 22. The surface of the bore wall 42 of the body 40 may also, if desired, be provided with a layer such as the layer 110.

The construction of the riser section 22 is exemplary as regards the construction of the riser sections 24, 26, 28 and 30. In accordance with the present invention it is possible that the riser end section 36, for example, be formed of a composite tubular body similar to the body 40 but having its filaments oriented to withstand maximum tensile or elongation load and bending loads along the axis 54 and be devoid of any buoyancy providing and collapse resisting structure as described in conjunction with the riser section 22. The riser section or sections 24 are typically provided with maximum or near maximum tensile strength of the body sections 40, for example, and buoyancy structure such as that described for the riser sections 22.

The riser sections 26, 28 and 30 because of their depth and position in the riser system 20 may not require tensile load bearing tubular body structures which require as great strength in tension but which require greater resistance to radial inward collapse due to the extreme hydrostatic pressure at great depth in the sea. For example, the outer shells 31, FIG. 1, of the riser section 30 and corresponding to the shells 102 should be formed of greater thickness than the shells 102 to withstand the tendency to collapse these structures at great depths in the sea. The body members 33 for the riser sections 30 may be designed for minimal tensile loading but maximum bending loading and internal hydrostatic pressure loading.

Finally, the lowest riser section 32 may be devoid of buoyancy structure but designed for maximum bending loads and collapse resistance. The riser section 32 may be of heavy walled and axially tapered filament wound-resin matrix construction to optimize its bending load carrying capability. Moreover, the length of the riser sections near the platform or vessel 10 may be longer to facilitate disconnection from the riser system during severe weather.

Accordingly, the advantages of providing composite inner and primary load bearing bodies as well as anti-collapse and buoyancy material containing shell structures for tubular members such as the riser sections 22, 24, 26, 28 and 30 may be tailored to the particular position of the riser section in an elongated riser system so as to have the particularly unique mechanical strength capabilities demanded of a section depending on its depth in the sea, or its position in the riser system primarily by the arrangement of the filaments making up the composite bodies such as the bodies 44 and the shell sections 102.

Referring now to FIG. 6, those skilled in the art will appreciate that the salient features of the present invention may be utilized in tubular members of various configurations for use in offshore submarine operations. For example, in FIG. 6 there is illustrated a tethered vessel comprising a production platform, generally designated by the numeral 130. The platform 130 includes a pair of spaced apart submersible hulls 131 supporting stability columns 133 and a deck 135. The platform 130 is adapted to be anchored to the seabed 132 by a plurality of elongated tubular members 134 which serve as tethers to offset the buoyant forces acting on columns 133 of the platform 130 and to anchor the platform 130 in a predetermined location with respect to the seabed 132. The tethers 134 are connected at their upper ends to the platform in a conventional manner and to a foundation 138 which is secured to the seabed 132 by pilings or other suitable means.

The tethers 134 are typically made up of a plurality of end to end connected tubular riser sections 137 virtually identical to the riser sections 22 illustrated in FIGS. 1 through 3. The riser sections 137 may be constructed generally along the lines of the riser sections 22 and be provided with opposed end couplings which are adapted to be connected to couplings of other riser sections 137 to make up the tethers 134.

Referring now to FIGS. 4 and 5, another embodiment of a composite riser in accordance with the present invention is illustrated and generally designated by the numeral 140. The riser section 140 includes an outer tensile load bearing and collapse resisting tubular shell member 141 which is suitably formed of a carbon or boron wound filament-resin matrix composite formed of the same materials and generally in accordance with the description of the tubular body 40 of the riser section 22. The shell body 141 is connected to opposed coupling members 143 having respective hub portions 144 which are provided with peripheral annular slots 145 for receiving the opposite ends of the shell body 141 whereby the body may be secured to the coupling members 143 in the same manner as the couplings of the riser section 22. The body 141 may be tapered axially at its opposite ends 146 or may be of uniform diameter throughout. The body 141 houses a plurality of fluid conducting tubular conduits 148, 150, and 152 which provide respective passages 154, 156, and 158 for conducting fluids through the riser section 140. The riser section 140 may, of course, be connected to similar riser sections for conducting fluids between a subsea manifold or wellhead and a surface vessel. The fluid conducting tubes 148, 150 and 152 are suitably in fluid flow conducting communication with the coupling ends 143 but are not tensile load bearing members. The tubes 148, 150 and 152 may also be formed of carbon or boron filaments embedded in a resin matrix or less expensive fibers such as glass or aramid may be used in place of the carbon or boron filaments, depending on the internal pressure induced forces acting on these elements and the external collapse inducing loads imposed on the tubes as a result of water pressure at the depth at which the riser section is disposed.

The riser section 140 is also charcterized by spaced apart buoyancy chambers 161 and 163 which are typically separated by generally cylindrical ribs 165 and 167. Suitable buoyancy material 166 may be disposed in the chambers 161 and 163 and formed of the same material as used for the riser sections 22. The ribs 165 and 167 are contiguous with the inner wall 169 of the shell body 141 and are also preferably disposed in closefitting relationship to the outside peripheral surfaces of the tubes 148, 150 and 152. The riser sections 140 are also preferably provided with a layer 168 of a water impermeable and non-galvanic reacting material over the entire outer surface of the shell body 141. The bores of the conduits 148, 150 and 152 may also be lined with a layer 172 of a material similar to that used for the layer 68 and the layer 110 of the riser section 22.

Those skilled in the art will recognize that various other types of tubular members particularly adapted as tensile load bearing structures and particularly adapted for a marine environment may be provided in accordance with the teachings of the present invention. Although preferred embodiments of the invention have been described in detail herein those skilled in the art will recognize that various substitutions and modifications may be made wtihout departing from the scope and spirit of the invention as recited in the appended claims.

What I claim is:

1. A marine riser for use in drilling or production of hydrocarbons from a subsea formation comprising:

elongated tubular body means constructed of a composite of elongated filaments of a material in a resin matrix having a modulus of elasticitiy not less than about $27 \times 10^6$ psi, said filaments being bonded in a resin matrix to form a load bearing member of said tubular body means having an elastic elongation strain characteristic under stress in tension not substantially greater than steel; and coupling means at opposite ends of said tubular body means for coupling said riser to a member for transmission of tensile loads through said tubular body means between said ends.

2. The riser set forth in claim 1 wherein:
said filaments extend longitudinally of said tubular body means.

3. The riser set forth in claim 2 wherein:
said filaments extend in a spiral direction around said tubular body means from one end toward the other end of said tubular body means.

4. The riser set forth in claim 3 wherein:
said filaments are formed of at least one of carbon and boron.

5. The riser set forth in claim 1 wherein:
said tubular body means includes a body member having an elongated bore and an elongated thin-walled sleeve disposed in said bore and contiguous with said body member but in nonload bearing relationshp thereto said sleeve being formed of an abrasion resistant and fluid impermeable material and disposed in protective relationship to said body member from fluids flowing through the interior of said body member.

6. The riser set forth in claim 5 wherein:
one of said sleeve and said body member include seal means cooperating with said sleeve and said body member to prevent leakage of fluid between said sleeve and said body member.

7. The riser set forth in claim 5 wherein:
said sleeve includes radially outward extending projection means in registration with cooperating groove means in said body member for maintaining said sleeve in position relative to said body member.

8. The riser set forth in claim 1 including:

respective members spaced apart in said body member at predetermined positions relative to said coupling means for generating signals.

9. The riser set forth in claim 1 including:
signal conductor means extending longitudinally of and within a filament-resin matrix of said tubular body means.

10. The riser set forth in claim 1 including:
buoyancy means disposed around said tubular body means comprising a plurality of annular low density buoyancy chambers formed by a plurality of structural annular ribs disposed around said tubular body means and interposed between at least some of said buoyancy chambers, and a generally annular shell disposed around said ribs and said buoyancy means and extending generally from one end of said tubular body means to the other.

11. The riser set forth in claim 10 wherein:
said ribs are contiguous with but not bonded to said tubular body means and are operable to transfer external pressure induced forces to said tubular body means from said shell.

12. The riser set forth in claim 10 wherein:
said shell comprises a filament-resin matrix shell body contiguous with said ribs and having a load bearing wall thickness sufficient to provide a predetermined strength to resist collapse from externally applied fluid pressure.

13. The riser set forth in claim 12 wherein:
said shell body is tapered at its opposite ends toward and is contiguous with and bonded to said tubular body means at said ends, respectively.

14. The riser set forth in claim 13 including:
generally conically tapered annular filler members contiguous with said shell body and said tubular body means at said tapered ends for transmitting fluid pressure induced forces between said shell body and said tubular body means.

15. The riser set forth in claim 12 wherein:
said shell body has a modulus of elasticity less than the modulus of elasticity of said tubular body means so as to minimize stresses induced in said shell body as a result of strain in said tubular body means.

16. The riser set forth in claim 12 including:
a substantially water impervious non-galvanic active layer on the exterior of said riser.

17. The riser set forth in claim 10 wherein:
said chambers are occupied with low density material positively buoyant in water and providing an overall buoyancy of said riser which is about neutral in sea water.

18. The riser set forth in claim 10 wherein:
said chambers are occupied with members which are contiguous with said shell body and said tubular body means to provide for transferring loads between said shell body and said tubular body means.

19. The riser set forth in claim 1 including:
a fluid impervious non-galvanic active layer on the interior surface of said tubular body means.

20. The riser set forth in claim 1 or 4 including:
a plurality of side by side coextensive tubular fluid conducting members extending between said coupling means.

21. The riser set forth in claim 20 including:
buoyancy means disposed around said fluid conducting members comprising a plurality of annular buoyancy chambers formed by a plurality of structural annular ribs disposed around said fluid conducting members and interposed between at least some of said buoyancy chambers, and said tubular body means comprises an annular shell body disposed around said ribs and said buoyancy means and extending between and secured to said coupling means.

22. The riser set forth in claim 21 wherein:
said ribs are contiguous with but not bonded to said fluid conducting members and are operable to transfer external pressure induced forces to said fluid conducting members from said shell body.

23. The riser set forth in claim 21 wherein:
said shell body is contiguous with said ribs and has a load bearing wall thickness sufficient to provide a predetermined strength to withstand tension and collapse inducing loads acting on said shell body.

24. A marine riser for use in drilling or production of hydrocarbons from a subsea formation comprising:
elongated tubular body means constructed of a composite of elongated filaments in a resin matrix to form a load bearing member of said tubular body means;
buoyancy means disposed around said tubular body means comprising a plurality of annular buoyancy chambers formed by a plurality of axially spaced apart cylindrical ribs disposed around said tubular body means, and a generally cylindrical shell disposed around said ribs and extending generally from one end of said tubular body means to the other, said ribs being in load bearing relationship with said tubular body means, said shell comprising a filament-resin matrix shell body contiguous with said ribs and having a load bearing wall thickness sufficient to provide a predetermined strength to resist collapse from externally applied fluid pressure; and
coupling means at opposite ends of said tubular body means for coupling said riser to a member for transmission of tensile loads through said tubular body means between said ends.

25. The marine riser set forth in claim 24 wherein:
at least selected ones of said ribs are formed integral with said shell body.

26. The riser set forth in claim 24 wherein:
said shell body has a modulus of elasticity in tension less than the modulus of elasticity in tension of said tubular body means so as to minimize stresses induced in said shell body as a result of longitudinal stain in said tubular body means.

27. A marine riser for use in drilling or production of hydrocarbons from a subsea formation comprising:
elongated tubular body means constructed of a composite of elongated filaments in a resin matrix to form a tension load bearing member of said tubular body means, said tubular body means having an elongated bore;
an elongated thinwalled sleeve disposed in said bore and coextensive with said tubular body means but in nonload bearing relationshp thereto when said tubular body means is in tension, said sleeve being formed of an abrasion resistant material and disposed in protective relationship to said tubular body means from fluids flowing through the interior of said tubular body means;
seal means cooperating with said sleeve to prevent leakage of fluid between said sleeve and said body means; and coupling means at opposite ends of said tubular body means for coupling said riser to a member for transmission of tensile loads through said tubular body means between said ends.

28. A marine riser system comprising a plurality of end to end coupled elongated riser sections extending generally vertically between a floating vessel and anchor means in the sea, said sections comprising elongated tensile load transmitting tubular body members being formed of a composite construction of filaments selected from at least one of carbon and boron in a resin matrix to provide a structure having a modulus of elasicity of at least about $27 \times 10^6$ psi in tension, at least some of said body members supporting an outer shell formed of a composite of filaments in a resin matrix, said sections being arranged in said riser system such that the shells of said sections at successively greater depth are constructed to resist collapse from water pressure exerted thereon.

29. A marine riser system comprising a plurality of end to end coupled elongated riser sections extending generally vertically between a floating vessel and anchor means in the sea, said sections comprising elongated tensile load transmitting tubular body members being formed of a composite construction of filaments in a resin matrix to provide said body members with a modulus of elasicity of at least about $27 \times 10^6$ psi in tension, at least selected ones of said body members supporting an outer shell formed of a composite of filaments in a resin matrix and providing buoyancy chamber means on said sections defined by said selected ones of body members; and at least the sections connected to said vessel and said anchor means having body members having greater strength in bending than the body members of others of said sections.

30. A conduit particularly adapted for use in drilling or production of hydrocarbons from an earth formation comprising:

elongated tubular body means constructed of a composite of elongated filaments of at least one of carbon and boron, said filaments extending in a generally spiral direction around said tubular body means from one end toward the other end of said tubular body means and being bonded in a resin matrix to form a load bearing member of said tubular body means having an elastic elongation strain characteristic under stress in tension not substantially greater than steel; and coupling means at opposite ends of said tubular body means for coupling said conduit to a member for transmission of tensile loads through said tubular body means between said ends.

31. The conduit set forth in claim 30 including:
respective members spaced apart in said tubular body means at predetermined positions relative to said coupling means for generating signals.

32. The conduit set forth in claim 30 including:
signal conductor means extending longitudinally of and within a filament-resin matrix of said tubular body means and between said coupling means at said opposite ends.

33. The conduit set forth in claim 30 wherein:
said filaments have a modulus of elasticity of not less than about $27 \times 10^6$ psi.

34. A conduit particularly adapted for use in drilling or production of hydrocarbons from an earth formation comprising:

elongated tubular body means constructed of a composite of elongated filaments in a resin matrix to form a tension load bearing member of said tubular body means, said tubular body means having an elongated bore;

an elongated thinwalled sleeve disposed in said bore and coextensive with said tubular body means but in nonload bearing relationship thereto when said tubular body means is in tension, said sleeve being formed of an abrasion resistant material and disposed in protective relationship to said tubular body means from fluids flowing through the interior of said tubular body means;

seal means cooperating with said sleeve to prevent leakage of fluid between said sleeve and said tubular body means; and coupling means at opposite ends of said tubular body means for coupling said conduit to a member for transmission of tensile loads through said tubular body means between said ends.

35. The conduit set forth in claim 34 wherein:
said sleeve includes radially outward extending projection means in registration with cooperating groove means in said tubular body means for maintaining said sleeve in position relative to said tubular body means.

36. The conduit set forth in claim 34 wherein:
said filaments are formed of one of carbon and boron and have a modulus of elasticity of at least about $27 \times 10^6$ psi.

* * * * *